(12) United States Patent
Janssen

(10) Patent No.: US 8,176,736 B2
(45) Date of Patent: May 15, 2012

(54) EGR APPARATUSES, SYSTEMS, AND METHODS

(75) Inventor: John M. Janssen, Nashville, IN (US)

(73) Assignee: Cummins Inc., Columbus, IN (US)

( * ) Notice: Subject to any disclaimer, the term of this patent is extended or adjusted under 35 U.S.C. 154(b) by 946 days.

(21) Appl. No.: 12/077,946

(22) Filed: Mar. 21, 2008

(65) Prior Publication Data

US 2009/0235661 A1 Sep. 24, 2009

(51) Int. Cl.
*F02B 33/44* (2006.01)
*F02B 33/00* (2006.01)
*F02M 25/07* (2006.01)

(52) U.S. Cl. .................. 60/605.2; 60/612; 123/562

(58) Field of Classification Search .......... 60/605.2, 60/612; 123/562; F02M 25/07
See application file for complete search history.

(56) References Cited

U.S. PATENT DOCUMENTS

| | | | | |
|---|---|---|---|---|
| 3,956,904 A | | 5/1976 | Edwards | |
| 3,968,649 A | * | 7/1976 | Edwards | 60/297 |
| 4,231,225 A | * | 11/1980 | Aya | 60/612 |
| 5,564,275 A | * | 10/1996 | Codan et al. | 60/605.2 |
| 5,791,146 A | * | 8/1998 | Dungner | 60/605.2 |
| 5,794,445 A | * | 8/1998 | Dungner | 60/605.2 |
| 5,937,650 A | * | 8/1999 | Arnold | 60/605.2 |
| 5,937,651 A | * | 8/1999 | Braun et al. | 60/605.2 |
| 6,216,458 B1 | * | 4/2001 | Alger et al. | 60/605.2 |
| 6,237,335 B1 | * | 5/2001 | Lonnqvist | 60/605.2 |
| 6,301,888 B1 | * | 10/2001 | Gray, Jr. | 60/605.2 |
| 6,412,278 B1 | | 7/2002 | Matthews | |
| 6,470,682 B2 | * | 10/2002 | Gray, Jr. | 60/605.2 |
| 6,820,599 B2 | | 11/2004 | Kurtz et al. | |
| 6,935,319 B2 | * | 8/2005 | Aupperle et al. | 123/568.12 |
| 7,013,879 B2 | | 3/2006 | Brookshire et al. | |
| 7,168,250 B2 | | 1/2007 | Wei et al. | |
| 7,299,793 B1 | * | 11/2007 | Tyo et al. | 123/568.12 |
| 7,490,462 B2 | * | 2/2009 | Roozenboom et al. | 60/278 |
| 7,571,608 B2 | * | 8/2009 | Boyapati et al. | 60/612 |
| 2007/0034171 A1 | * | 2/2007 | Griffin et al. | 122/479.1 |
| 2009/0255251 A1 | * | 10/2009 | Paffrath | 60/605.2 |
| 2010/0293944 A1 | * | 11/2010 | Hunter | 60/605.2 |

FOREIGN PATENT DOCUMENTS

| | | | | |
|---|---|---|---|---|
| EP | 620365 A1 | * | 10/1994 | |
| EP | 1 186 767 A2 | | 3/2002 | |
| EP | 1186767 A2 | * | 3/2002 | 60/605.2 |
| EP | 2196659 A1 | * | 6/2010 | |
| GB | 2464500 A | * | 4/2010 | |
| JP | 2000008963 A | * | 1/2000 | |
| JP | 2004100508 A | * | 4/2004 | |

* cited by examiner

*Primary Examiner* — Thai Ba Trieu
(74) *Attorney, Agent, or Firm* — Krieg DeVault LLP

(57) ABSTRACT

One embodiment is a unique system which is operable to provide a mixture of charge air and exhaust to an internal combustion intake at a sub-ambient temperature. Further embodiments, forms, objects, features, advantages, aspects, and benefits shall become apparent from the following description and drawings.

24 Claims, 6 Drawing Sheets

EGR APPARATUSES, SYSTEMS, AND METHODS

BACKGROUND

Present approaches to exhaust gas recirculation ("EGR") suffer from a variety of drawbacks, limitations, disadvantages and problems including those respecting cooling, circulation, efficiency and others. There is a need for the unique and inventive EGR apparatuses, systems and methods disclosed herein.

SUMMARY

One embodiment is a unique system which is operable to provide a mixture of charge air and exhaust to an internal combustion engine intake at a sub-ambient temperature. Further embodiments, forms, objects, features, advantages, aspects, and benefits shall become apparent from the following description and drawings.

DETAILED DESCRIPTION

For the purposes of promoting an understanding of the principles of the invention, reference will now be made to the embodiments illustrated in the figures and specific language will be used to describe the same. It will nevertheless be understood that no limitation of the scope of the invention is thereby intended. Such alterations and further modifications in the illustrated embodiments, and such further applications of the principles of the invention as illustrated therein are contemplated as would occur to one skilled in the art.

Figure 1:
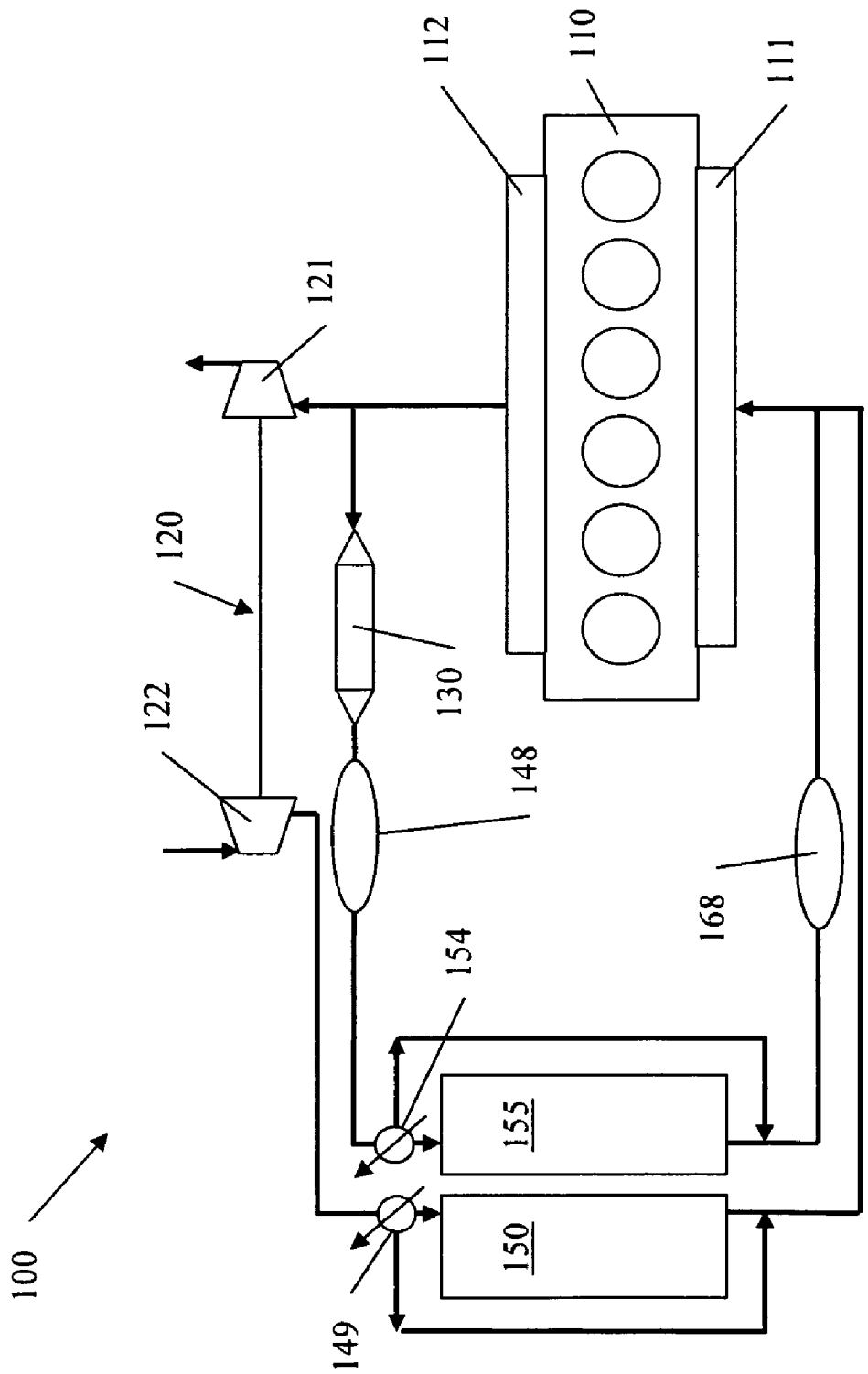
FIG. 1 is a schematic of a first embodiment of an exhaust gas recirculation system for an internal combustion engine.

With reference to FIG. 1, there is illustrated internal combustion engine system 100 which includes engine 110. In the illustrated embodiment, engine 110 is an in-line six-cylinder diesel engine whose cylinders are flow coupled with an intake manifold 111 and an exhaust manifold 112. A number of additional engine configurations are also contemplated, for example, more or fewer cylinders might be present, the cylinder configuration could be a V configuration or a flat configuration, the engine might combust fuels other than or in addition to diesel fuel, spark ignition or other types of ignition might be used, and/or configurations other than reciprocating piston configurations such as rotary engine configurations could be used. Depending on the engine configuration, there may be additional manifolds, split manifolds, or one or more cylinders might be ported independent of a manifold.

During engine operation exhaust is expelled to exhaust manifold 112 which provides exhaust to EGR cooler 130 and to turbine 121 of turbocharger 120 via the illustrated exhaust conduits. Turbine 121 is preferably a variable geometry turbine but could also be another type of turbine, for example, a variable nozzle turbine, a fixed geometry turbine, an internally wastegated turbine, or an externally wastegated turbine. As shown in the illustrated embodiment, exhaust flows from exhaust manifold 112 through an exhaust conduit and a portion of the exhaust is then routed through a conduit leading to EGR cooler 130, while another portion of the exhaust is routed to drive turbine 121 of turbocharger 120. Exhaust may also be routed through separate conduits coupled to exhaust manifold 112, one leading to an EGR cooler and the other leading to turbine 121. The illustrated embodiment shows a high pressure loop EGR flow path in which exhaust gas is recirculated from a location upstream of turbine 121 to a location downstream of compressor 122. Other embodiments contemplate low pressure loop EGR flow paths. Additional embodiments contemplate supercharging systems which utilize a compressor driven by means other than an exhaust turbine such as, for example, an electric motor, a drive shaft, a drive belt, a hydraulic drive, a pneumatic drive or a combination thereof. Additional embodiments contemplate supercharging systems with multiple compression stages such as series turbochargers, or other staged compressor configurations. Furthermore, coolers may be present between or after compression stages.

Turbine 121 is coupled to and drives compressor 122 to intake fresh air (which may optionally be filtered) and to output compressed charge air which is then routed to charge air cooler 150. EGR pump 148 is operable to pump exhaust form EGR cooler 130 to EGR cooler 155. EGR pump 148 is preferably a rotary centrifugal compressor which could be driven by a belt, an electric motor, a turbine, a pneumatic drive source, a hydraulic drive source, or a combination thereof. Additional embodiments contemplate that EGR pump 148 could be another type of pump, for example, a reciprocating pump, or a vane pump. EGR cooler 130 is preferably a parallel flow cooler and preferably utilizes coolant which circulates through a cooling circuit to cool exhaust gas within EGR cooler 130, but could also be another type of cooler, for example, a counterflow cooler or a cooler that dissipates heat to the surrounding environment. The coolant is preferably engine coolant which is circulated by an engine coolant pump. The coolant could also be other coolant which is circulated through a separate cooling circuit by a separate pump.

From EGR pump 148 exhaust is routed to EGR cooler 155. EGR cooler 155 preferably cools exhaust flowing through it by dissipating heat to the surrounding environment, typically ambient air. The ambient air could be ram air which flows past EGR cooler 155 due to vehicle motion, or forced air which is driven by a fan. Additional embodiments contemplate use of alternate types of coolers. For example, cooler 130 could cool using a gas flowing or expanding through a coolant circuit, or could be an ambient type cooler similar to cooler 155. Furthermore, cooler 155 could include a cooling circuit through which liquid or gas coolant is circulated to cool EGR. Additionally, charge air cooler 150 could be any of the foregoing types of coolers. Either or both of charge air cooler 150 and EGR cooler 155 may optionally include bypass valves 149 and 154 which can be controlled (for example by an ECM, ECU or other controller) to partially or completely bypass flow around their respective coolers. EGR cooler 130 may also optionally be provided with a bypass valve and bypass flowpath.

From EGR cooler 155 exhaust is routed to expander 168. Expander 168 allows exhaust gas to expand and can preferably extract work from the expansion of exhaust gas. Expander 168 could be, for example, a turbine with a shaft or other mechanical connection to EGR pump 148, a vane type expander, a piston-type expander, or any other configuration operable to allow expansion of exhaust and extract work from the expansion. Extracted work can be received by an electric generator, a hydraulic pump, a mechanical shaft or some other component and can be provided for immediate use by EGR pump 148, or delivered to the crankshaft of engine 100, for example by a flywheel motor-generator, or received for storage in a battery, a capacitor such as a super-capacitor, an ultracapacitor or an electrochemical double layer capacitor, a hydraulic accumulator, or another energy-storage device. Flow from charge air cooler 150 and expander 168 is supplied to intake manifold 111 and then to the cylinders of engine 110. While it is preferred that expander 168 can extract work from the expansion of exhaust gas, certain embodiments may omit this capability. While it is preferred that expander 168 be present to allow exhaust gas to expand, certain embodiments may omit expander 168 and have a connection from the outlet of EGR cooler 155 or its bypass to intake manifold 111.

System 100 may be operated to provide a mixture of charge air and exhaust to an internal combustion engine intake at a sub-ambient temperature. For example, in one mode of operation, cooler 150 is operable to cool charge air to a temperature at or near ambient temperature, cooler 130 is operable to cool exhaust to a temperature at or near the temperature of engine coolant, cooler 155 is operable to cool exhaust to a temperature at or near ambient temperature, expander 168 is operable to cool exhaust to a sub-ambient temperature, and a mixture of the output of expander 168 and cooler 150 can be provided to the intake of engine 110 at a sub-ambient temperature. In additional modes of operation, charge air and exhaust can be cooled to a variety of other pre-intake temperatures while still providing a mixture of charge air and exhaust to the intake of engine 110 at a sub-ambient temperature.

Figure 2:
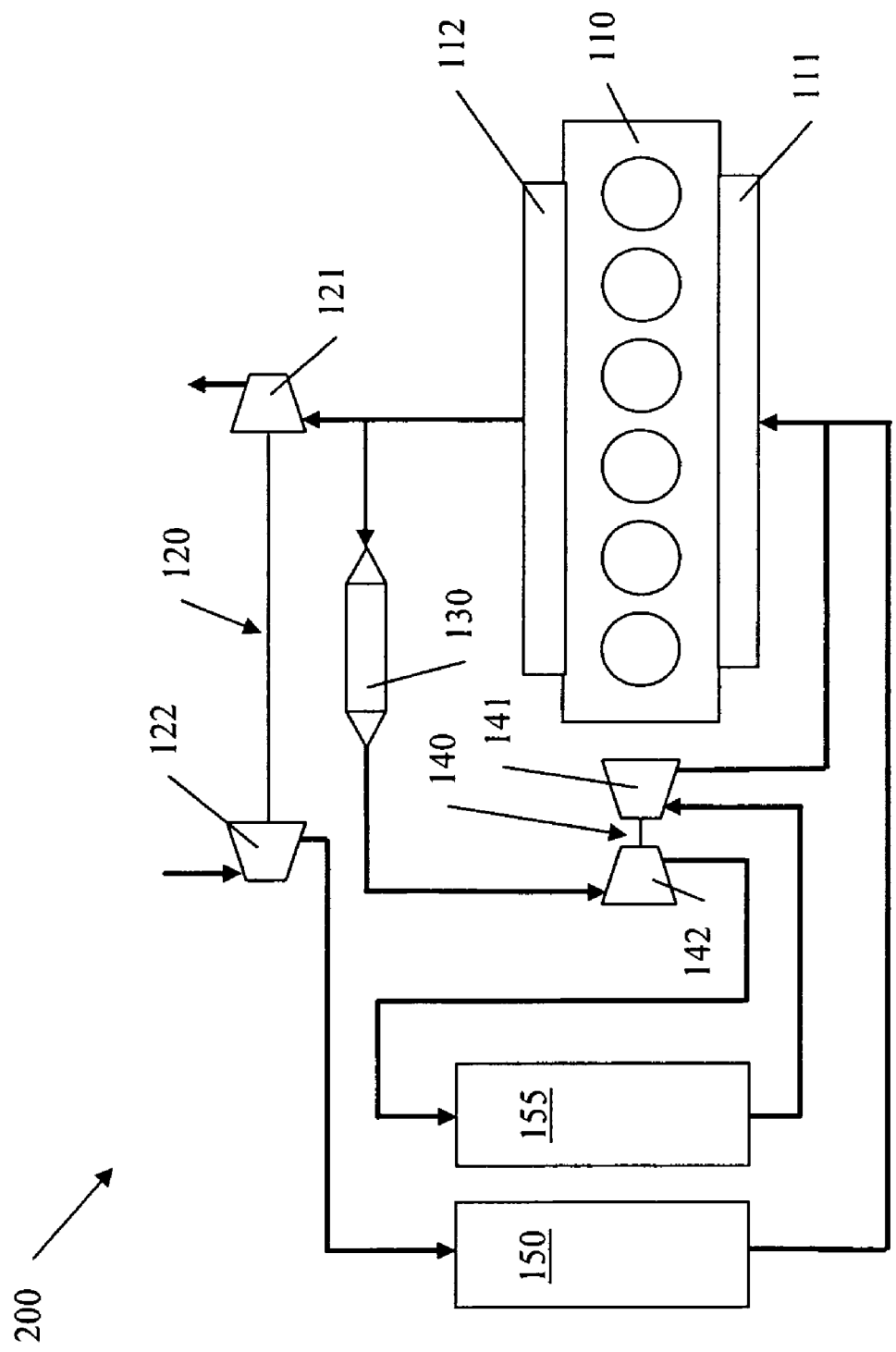
FIG. 2 is a schematic of a second embodiment of an exhaust gas recirculation system for an internal combustion engine.

With reference to FIG. 2 there is illustrated internal combustion engine system 200. System 200 includes multiple features described above in connection with FIG. 1 which are labeled with the same reference numerals as used in FIG. 1. As illustrated in FIG. 2 exhaust flows from EGR cooler 130 to rotary centrifugal compressor 142 of EGR pump 140. Compressor 142 compresses exhaust and pumps the compressed exhaust to EGR cooler 155. From EGR cooler 155, compressed cooled exhaust proceeds to turbine 141 where it is cooled through expansion and provides driving force to turbine 141 and to EGR pump 140. EGR pump 140 is also driven by an external power source, for example, a drive shaft, a drive belt, an electric motor, a hydraulic drive, a pneumatic drive, a variable speed device drive or a combination thereof. In the illustrated embodiment compressor 142 and turbine 141 are coupled to a common shaft which is also coupled with the external power source. Turbine 141 is preferably a variable geometry turbine which can be adjusted to achieve desired compressor pressure ratio, shaft speed, outlet temperature, engine emissions, and/or fuel economy, but could also be another type of turbine, for example, a variable nozzle turbine, a fixed geometry turbine, an internally wastegated turbine, or an externally wastegated turbine. Turbine 141 can extract work from the expansion of exhaust gas to assist in driving compressor 142 or extracted work can be provided to one of a variety of other elements as described above in connection with expander 168. From turbine 141 exhaust is provided to intake manifold 111 and then to the cylinders of engine 110.

System 200 may be operated to provide a mixture of charge air and exhaust to an internal combustion engine intake at a sub-ambient temperature. For example, in one mode of operation, cooler 150 is operable to cool charge air to a temperature at or near ambient temperature, cooler 130 is operable to cool exhaust to a temperature at or near the temperature of engine coolant, cooler 155 is operable to cool exhaust to a temperature at or near ambient temperature, turbine 141 is operable to cool exhaust to a sub-ambient temperature, and a mixture of the output of turbine 141 and cooler 150 can be provided to the intake of engine 110 at a sub-ambient temperature. In additional modes of operation, charge air and exhaust can be cooled to a variety of other pre-intake temperatures while still providing a mixture of charge air and exhaust to the intake of engine 110 at a sub-ambient temperature.

Figure 3:
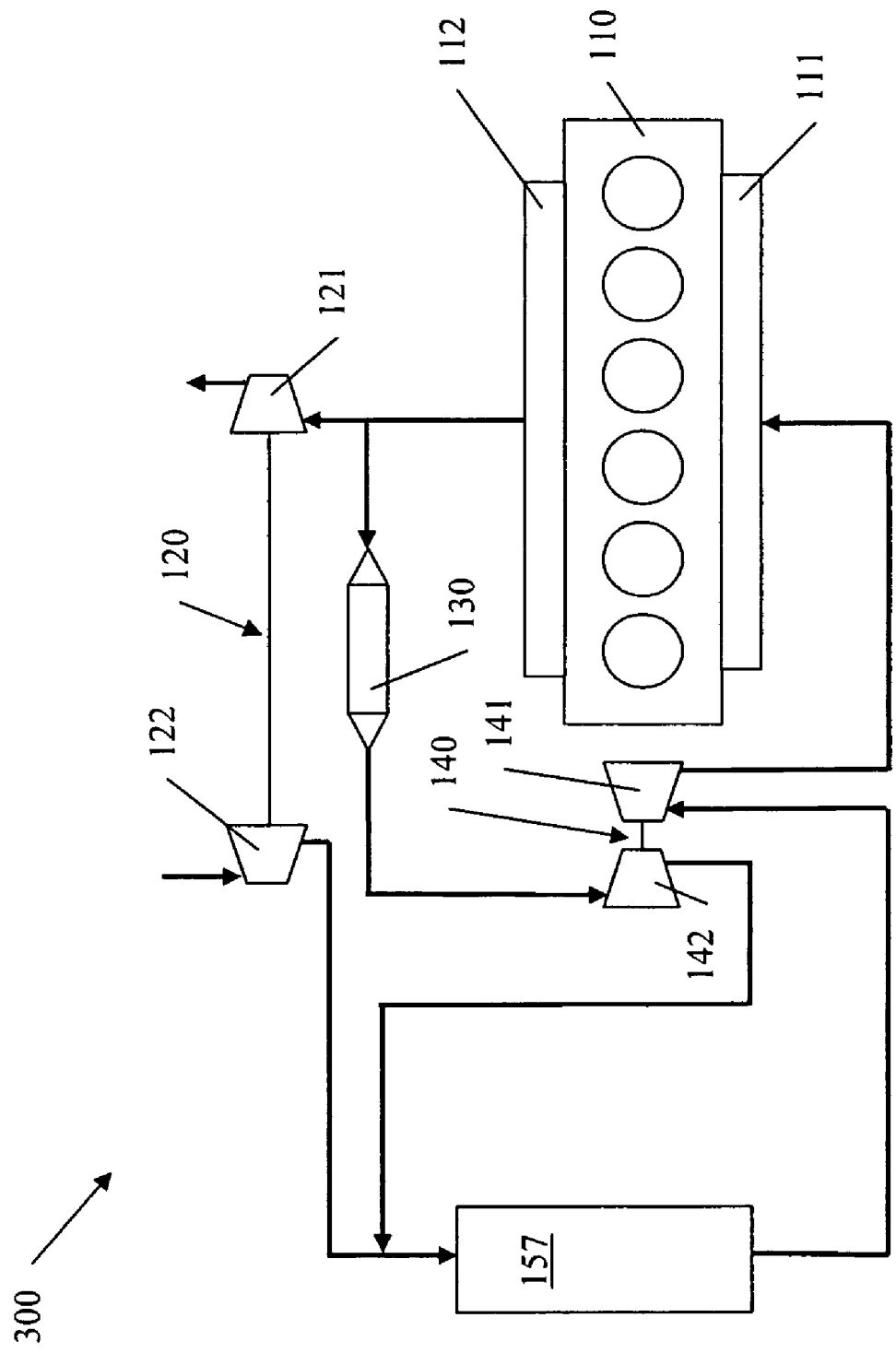
FIG. 3 is a schematic of a third embodiment of an exhaust gas recirculation system for an internal combustion engine.

With reference to FIG. 3 there is illustrated an internal combustion engine system 300. System 300 includes multiple features described above which are labeled with the same reference numerals as used in the foregoing Figs. As illustrated in FIG. 3 exhaust flows from EGR cooler 130 to compressor 142 of EGR pump 140. Compressor 142 compresses exhaust and pumps the compressed exhaust into a charge air flowpath upstream of mixed charge cooler 157 which preferably cools a mixture of exhaust and charge air flowing through it by dissipating heat to the surrounding environment, but could also be any of the alternative cooler types described above in connection with coolers 130, 150 and 155. From mixed charge cooler 157, the mixture of compressed cooled exhaust and charge air proceeds to turbine 141 where it is cooled through expansion and provides driving force to turbine 141. In alternative embodiments, charge air and recirculated exhaust gas may be cooled by separate coolers and then mixed before being provided to turbine 141. From turbine 141 exhaust is provided to intake manifold 111 and then to the cylinders of engine 110.

In system 300 the mixture of EGR and charge air has a much larger flow rate than either stream alone. Expander 141 thus has a much greater mass flow rate than compressor 142, and can provide more power than compressor 142 requires. Under many operating conditions, EGR pump 140 can deliver power to the engine or to another receiver of extracted work rather than being a net power consumer. This power can be provided by turbocharger 120 and then extracted by turbine 141. Rather than deliberately reducing efficiency of turbine 121 to drive exhaust manifold pressure high enough that EGR will flow from exhaust to intake manifold, turbine 121 operates at high efficiency and low pressure ratio, delivering more power to compressor 122 so the compressed charge air entering mixed charge cooler 157 is at similar pressure to that of EGR leaving compressor 142. Thus, turbine 121 invests extra energy into the fresh air stream, and that energy is harvested by turbine 141.

System 300 may be operated to provide a mixture of charge air and exhaust to an internal combustion engine intake at a sub-ambient temperature. For example, in one mode of operation, cooler 130 is operable to cool exhaust to a temperature at or near the temperature of engine coolant, cooler 157 is operable to cool a mixture of exhaust and charge air to a temperature at or near ambient temperature, turbine 141 is operable to cool a mixture of exhaust and charge air to a sub-ambient temperature, and a mixture of exhaust and charge air can be provided to the intake of engine 110 at a sub-ambient temperature. In additional modes of operation, charge air and exhaust can be cooled to a variety of other pre-intake temperatures while still providing a mixture of charge air and exhaust to the intake of engine 110 at a sub-ambient temperature.

Figure 4:
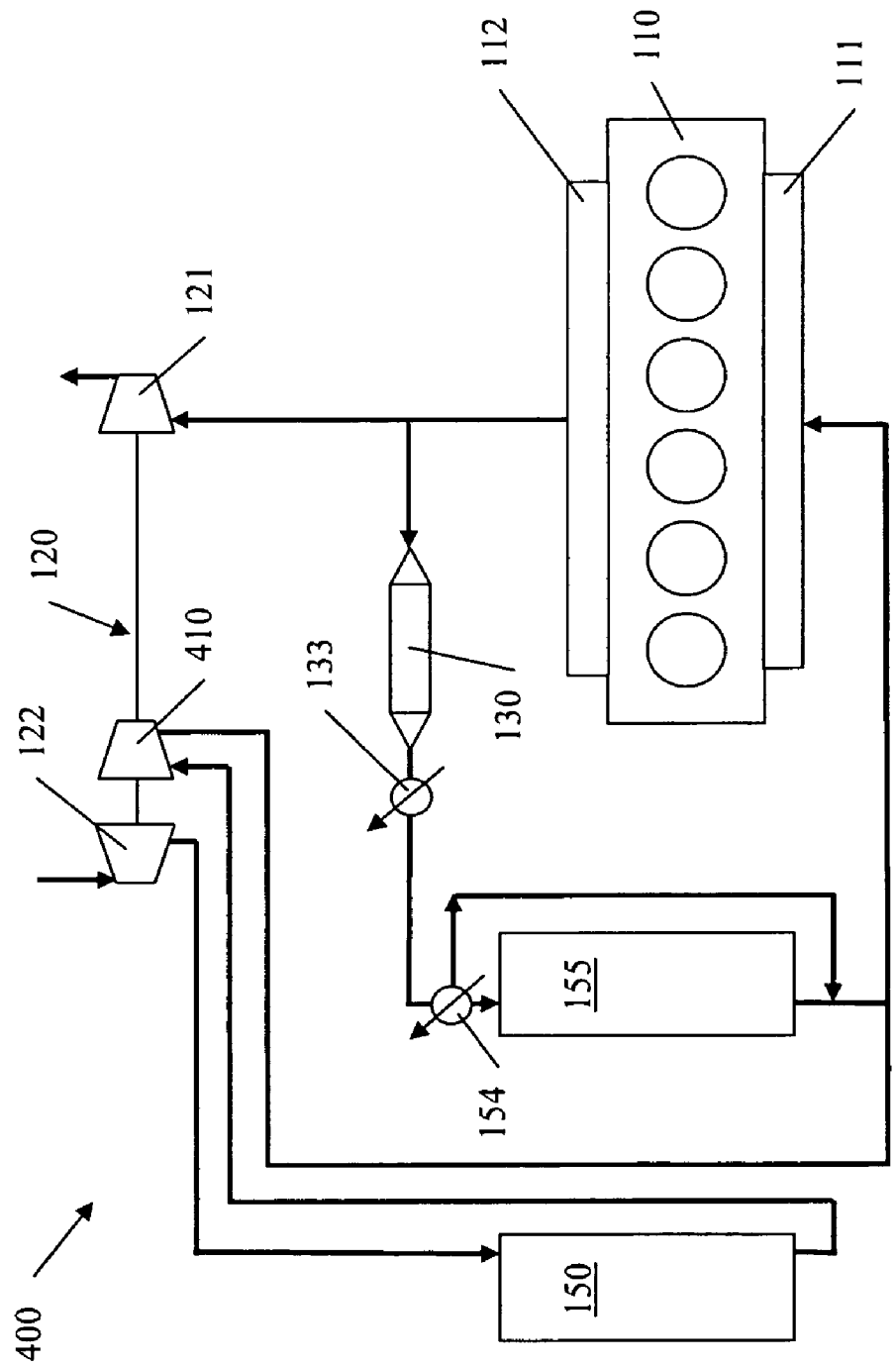
FIG. 4 is a schematic of a fourth embodiment of an exhaust gas recirculation system for an internal combustion engine.

With reference to FIG. 4 there is illustrated an internal combustion engine system 400. System 400 includes multiple features described in the foregoing Figs. which are labeled with the same reference numerals used in the foregoing Figs. System 400 includes an expander 410 which is preferably a turbine, most preferably a variable geometry turbine, mounted on a common shaft with turbine 121 and compressor 122 of turbocharger 120. In other embodiments expander 410 can be differently coupled with turbocharger 120 via one or more mechanical, electrical, hydraulic or other linkages or a combination thereof. In other embodiments expander 410 can be selectably coupled and de-coupled with turbocharger 120. In other embodiments, expander 410 can be independent of turbocharger 120. Expander 410 receives charge air which has been compressed by compressor 122 and cooled by charge air cooler 150. Expander 410 expands the charge air which it receives and outputs to intake manifold 111. Expander 410 can extract work from the expansion of exhaust gas to assist in driving compressor 122 or extracted work can be provided to one of a variety of other elements as described above in connection with expander 168.

System 400 includes EGR cooler 130 which can receive and cool a portion of the exhaust gas output by engine 110. An EGR valve 133 is preferably positioned downstream from EGR cooler 130, but could also be positioned in other locations, for example, upstream of EGR cooler 130 or further downstream than the illustrated position. EGR valve 133 is preferably operable to vary the amount of recirculated exhaust gas that passes through EGR cooler 130, but could also be an on/off valve. From EGR valve 133, recirculated exhaust gas passes to bypass valve 154 which is preferably operable to selectively vary the amount of recirculated exhaust gas provided to EGR cooler 155 or bypassed around EGR cooler 155, but could also be a binary valve which routes all recirculated exhaust gas either to EGR cooler 155 or to bypass EGR cooler 155. Recirculated exhaust gas from EGR cooler 155, bypassed around EGR cooler 155, or both can be mixed with charge air from expander 410 and provided to intake manifold 111.

In a preferred mode of operation system 400 is operable to provide charge air from compressor 122 which has been compressed to pressure greater than that which would allow recirculation of exhaust gas through a high pressure loop exhaust recirculation path. The work used to compress the air to this pressure is extracted by expander 410. It should be appreciated that system 400 could also include a two-stage turbocharging system.

System 400 may be operated to provide a mixture of charge air and exhaust to an internal combustion engine intake at a sub-ambient temperature. For example, in one mode of operation, cooler 130 is operable to cool exhaust to a temperature at or near the temperature of engine coolant, cooler 155 is operable to cool exhaust to a temperature at or near ambient temperature, cooler 150 is operable to cool charge air to a temperature at or near ambient temperature, turbine 410 is operable to cool charge air to a sub-ambient temperature, and a mixture of exhaust and charge air can be provided to the intake of engine 110 at a sub-ambient temperature. In additional modes of operation, charge air and exhaust can be cooled to a variety of other pre-intake temperatures while still providing a mixture of charge air and exhaust to the intake of engine 110 at a sub-ambient temperature.

Figure 5:
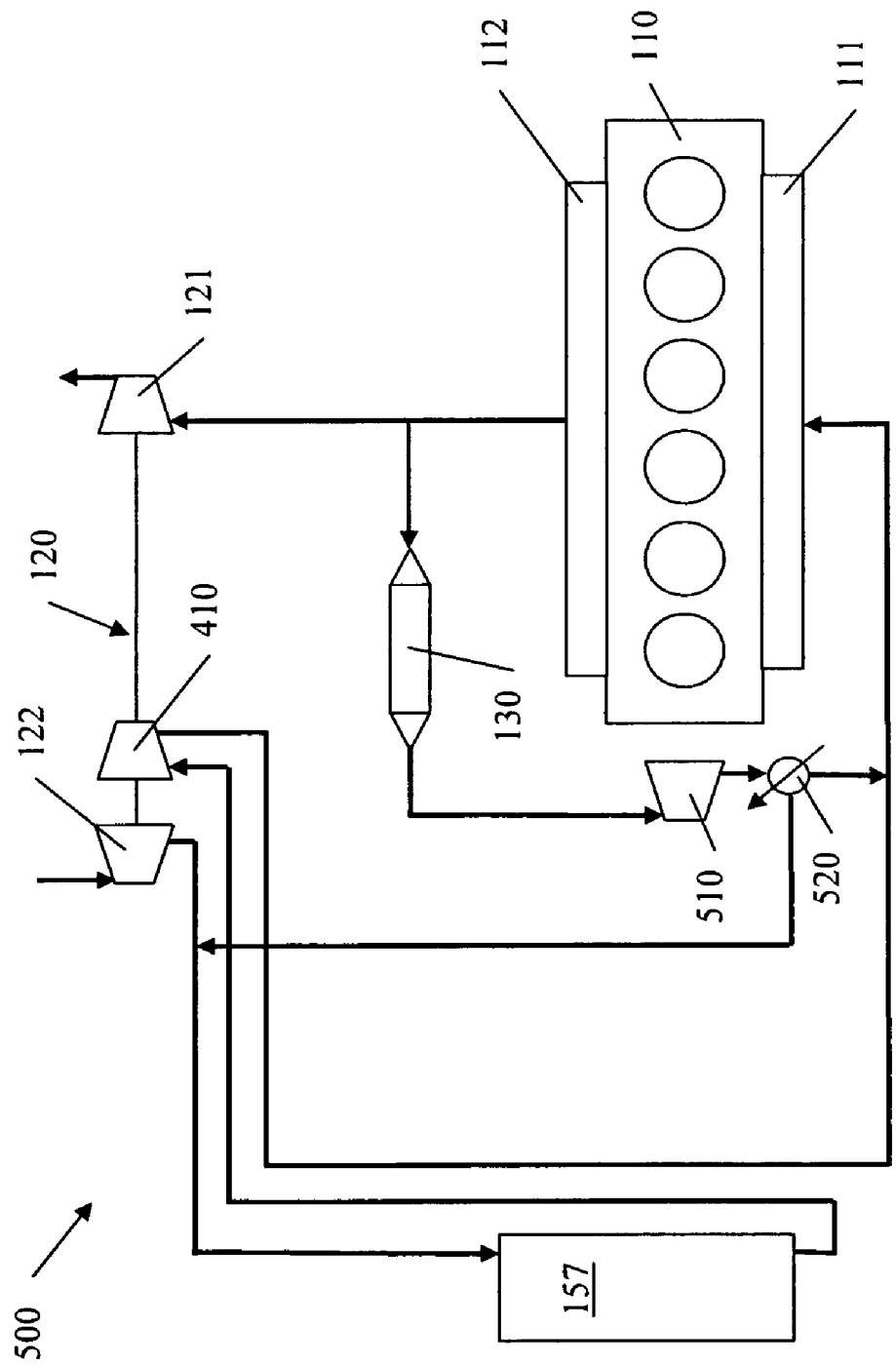
FIG. 5 is a schematic of a fifth embodiment of an exhaust gas recirculation system for an internal combustion engine.

With reference to FIG. 5 there is illustrated an internal combustion engine system 500. System 500 includes multiple features described in the foregoing Figs. which are labeled with the same reference numerals used in the foregoing Figs. System 500 includes an EGR pump 510 positioned downstream of EGR cooler 130 and which is operable to selectably control the flow of exhaust gas through EGR cooler 130. EGR pump 510 is preferably a turbo-compressor-type pump. EGR pump 510 could be electrically driven, mechanically driven, hydraulically driven, pneumatically driven or driven by a combination thereof. In one embodiment EGR pump 510 is driven by a high speed electric motor powered by an engine driven alternator. In one embodiment EGR pump 510 is driven by a hydraulic motor.

From EGR pump 510 recirculated exhaust gas proceeds to valve 520 which is operable to selectably route recirculated exhaust gas to intake manifold 111 or to a location upstream of mixed charge cooler 157. Mixed charge cooler 157 is operable to cool compressed charge air received from compressor 122 or, when recirculated exhaust is provided upstream of mixed charge cooler, to cool a mixture of compressed charge air and recirculated exhaust gas.

System 500 may be operated to provide a mixture of charge air and exhaust to an internal combustion engine intake at a sub-ambient temperature. For example, in one mode of operation, cooler 130 is operable to cool exhaust to a temperature at or near the temperature of engine coolant, cooler 157 is operable to cool a mixture of exhaust and charge air to a temperature at or near ambient temperature, turbine 410 is operable to expand a mixture of exhaust and charge air to a sub-ambient temperature, and a mixture of exhaust and charge air can be provided to the intake of engine 110 at a sub-ambient temperature. In additional modes of operation, charge air and exhaust can be cooled to a variety of other pre-intake temperatures while still providing a mixture of charge air and exhaust to the intake of engine 110 at a sub-ambient temperature.

Figure 6:
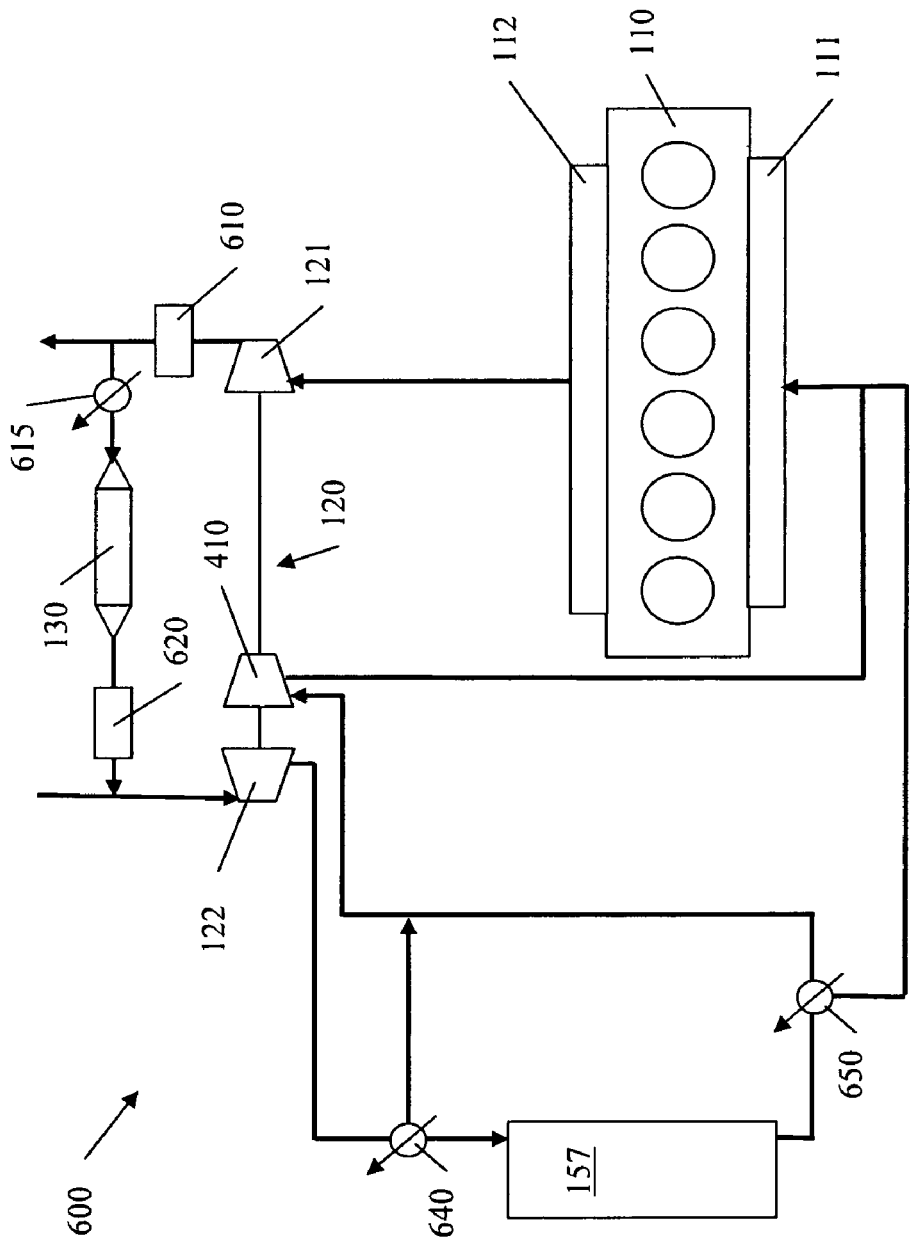
FIG. 6 is a schematic of a fifth embodiment of an exhaust gas recirculation system for an internal combustion engine.

With reference to FIG. 6 there is illustrated an internal combustion engine system 600. System 600 includes many of the features described in the foregoing Figs. which are labeled with the same reference numerals used in the foregoing Figs. System 600 includes a low pressure loop exhaust gas recirculation in which exhaust gas passes from turbine 121 to one or more aftertreatment components 610 from which an EGR valve 615 can selectably pass a portion of the exhaust gas to EGR cooler 130. From EGR cooler 130 recirculated exhaust gas passes to water separator or condensation separator 620. From separator 620, recirculated exhaust gas is mixed with charge air and the mixture is passed to compressor 122. From compressor 122, the mixture passes to valve 640. Valve 640 is operable to selectably route the mixture to mixed charge cooler 157 or to bypass mixed charge cooler 157 and route all or a portion of the mixture to expander 410. From mixed charge cooler 157 the mixture passes to valve 650 which is selectably operable to route the mixture to expander 410, or to bypass expander 410 and route the mixture to intake manifold 111.

System 600 may be operated to provide a mixture of charge air and exhaust to an internal combustion engine intake at a sub-ambient temperature. For example, in one mode of operation, cooler 130 is operable to cool exhaust to a temperature at or near the temperature of engine coolant, cooler 157 is operable to cool a mixture of exhaust and charge air to a temperature at or near ambient temperature, turbine 410 is operable to a mixture of exhaust and charge air to a sub-ambient temperature, and a mixture of exhaust and charge air can be provided to the intake of engine 110 at a sub-ambient temperature. In additional modes of operation, charge air and exhaust can be cooled to a variety of other pre-intake temperatures while still providing a mixture of charge air and exhaust to the intake of engine 110 at a sub-ambient temperature.

While exemplary embodiments of the invention have been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method comprising: operating an internal combustion engine to output exhaust; recirculating a portion of the exhaust; cooling the recirculated exhaust with a first cooler; compressing the recirculated exhaust; cooling the recirculated exhaust with a second cooler; expanding the recirculated exhaust effective to cool the recirculated exhaust to a sub-ambient temperature; and providing the exhaust to an intake of the internal combustion engine.

2. A method according to claim 1 wherein the cooling the recirculated exhaust with a first cooler includes transferring heat from the recirculated exhaust to an engine coolant.

3. A method according to claim 1 wherein the compressing the recirculated exhaust includes passing the recirculated exhaust through a centrifugal compressor.

4. A method according to claim 1 wherein the cooling the recirculated exhaust with a second cooler includes dissipating heat to an ambient environment.

5. A method according to claim 1 wherein the expanding the recirculated exhaust includes passing the recirculated exhaust through an expansion turbine.

6. A method according to claim 1 wherein the providing the exhaust to an intake of the internal combustion engine includes mixing the exhaust with charge air and passing the mixture to an intake manifold.

7. A method comprising: operating an internal combustion engine to generate exhaust; recirculating a portion of the exhaust to provide recirculated exhaust; intaking air to provide charge air; passing the recirculated exhaust gas through a cooler; passing the charge air through a cooler; expanding at least one of the charge air and the recirculated exhaust; and providing a mixture of the charge air and the recirculated exhaust gas to an intake of the internal combustion engine at a sub-ambient temperature.

8. A method according to claim 7 wherein the expanding at least one of the charge air and the recirculated exhaust includes passing at least one of the charge air and the recirculated exhaust through an expansion turbine.

9. A method comprising: operating an internal combustion engine to generate exhaust; recirculating a portion of the exhaust to provide recirculated exhaust; intaking air to provide charge air; passing the recirculated exhaust gas through a cooler; passing the charge air through a cooler; expanding at least one of the charge air and the recirculated exhaust wherein the expanding at least one of the charge air and the recirculated exhaust includes passing a mixture of the charge air and the recirculated exhaust through an expansion turbine; and providing the mixture of the charge air and the recirculated exhaust gas to an intake of the internal combustion engine at a sub-ambient temperature.

10. A system comprising: engine means for generating exhaust; valve means for recirculating the exhaust to provide recirculated exhaust; compressor means for intaking air to provide charge air; expander means for expanding a mixture of the charge air and the recirculated exhaust; and manifold means for providing the mixture of the charge air, having been expanded, and the recirculated exhaust gas to an intake of an internal combustion engine at a sub-ambient temperature.

11. A system comprising: an exhaust conduit flow coupled to an exhaust source; a first EGR cooler flow coupled to the exhaust conduit and operable to cool exhaust received from the exhaust conduit; a compressor flow coupled to the first EGR cooler and operable to compress exhaust received from the first EGR cooler; a second EGR cooler flow coupled to the compressor and operable to cool exhaust received from the compressor; and an expander flow coupled to the second EGR cooler and operable to cool exhaust received from the second EGR cooler to a sub-ambient temperature.

12. A system according to claim 11 wherein the first EGR cooler utilizes coolant circulating though the first EGR cooler to cool exhaust.

13. A system according to claim 11 wherein the second EGR cooler cools exhaust by dissipating heat to an ambient environment.

14. A system according to claim 11 wherein the compressor includes a compressor wheel.

15. A system according to claim 14 wherein the expander includes a turbine wheel coupled with the compressor wheel.

16. A system according to claim 11 further comprising an intake manifold flow coupled to the expander and operable to route exhaust and charge air to a plurality of intake ports.

17. A system according to claim 11 further comprising an exhaust manifold flow coupled to exhaust conduit and operable to route exhaust from a plurality of outlet ports to the exhaust conduit.

18. A system according to claim 11, wherein the expander is operable to expand exhaust in combination with charge air.

19. A system comprising: an exhaust conduit flow coupled to an exhaust outlet of an internal combustion engine; a first cooler flow coupled to the exhaust conduit and operable to cool exhaust received from the exhaust conduit; a second cooler flow coupled to the first cooler and operable to cool exhaust received from the first cooler; an expander operable to expand at least one of exhaust and charge air; wherein the system is operable to provide a mixture of charge air and exhaust to the internal combustion engine intake at a sub-ambient temperature.

20. A system according to claim 19 wherein the expander is a rotatable turbine.

21. A system according to claim 19 wherein the expander is operable to expand exhaust.

22. A system according to claim 19 further comprising means for receiving work extracted from the expander.

23. A system comprising: an exhaust conduit flow coupled to an exhaust source of an internal combustion engine; a first cooler flow coupled to the exhaust conduit and operable to cool exhaust received from the exhaust conduit; a second cooler flow coupled to the first cooler and operable to cool exhaust received from the first cooler; an expander operable to expand charge air; wherein the system is operable to provide a mixture of the charge air having been expanded by the expander and the exhaust to the internal combustion engine intake at a sub-ambient temperature.

24. A system comprising: an exhaust conduit flow coupled to an exhaust source of an internal combustion engine; a first cooler flow coupled to the exhaust conduit and operable to cool exhaust received from the exhaust conduit; a second cooler flow coupled to the first cooler and operable to cool exhaust received from the first cooler; an expander operable to expand a mixture of charge air and exhaust; wherein the system is operable to provide the mixture of the charge air and the exhaust, having been expanded by the expander, to the internal combustion engine intake at a sub-ambient temperature.

* * * * *